United States Patent
Mandal et al.

(10) Patent No.: US 11,243,834 B1
(45) Date of Patent: Feb. 8, 2022

(54) LOG PARSING TEMPLATE GENERATION

(71) Applicant: INTERNATIONAL BUSINESS MACHINES CORPORATION, Armonk, NY (US)

(72) Inventors: Atri Mandal, Bangalore (IN); Prateeti Mohapatra, Bangalore (IN); Anbang Xu, San Jose, CA (US); Xiaotong Liu, San Jose, CA (US); Pujitha Kara, Milpitas, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/099,468

(22) Filed: Nov. 16, 2020

(51) Int. Cl.
 *G06F 11/00* (2006.01)
 *G06F 11/07* (2006.01)
 *G06F 11/32* (2006.01)
 *G06F 11/30* (2006.01)

(52) U.S. Cl.
 CPC .......... *G06F 11/079* (2013.01); *G06F 11/076* (2013.01); *G06F 11/3006* (2013.01); *G06F 11/3075* (2013.01); *G06F 11/327* (2013.01)

(58) Field of Classification Search
 CPC .. G06F 11/079; G06F 11/076; G06F 11/3006; G06F 11/3075; G06F 11/327
 See application file for complete search history.

(56) References Cited

U.S. PATENT DOCUMENTS

| | | |
|---|---|---|
| 7,653,633 B2 | 1/2010 | Villella et al. |
| 8,873,813 B2 | 10/2014 | Tadayon |
| 9,411,672 B1 | 8/2016 | Cooper et al. |
| 9,916,538 B2 | 3/2018 | Zadeh |
| 10,140,287 B2 | 11/2018 | Dasgupta et al. |
| 10,573,003 B2 | 2/2020 | Sethi |
| 2008/0005265 A1* | 1/2008 | Miettinen ............. G06F 40/186 709/217 |
| 2011/0185234 A1* | 7/2011 | Cohen ................... G06F 16/285 714/37 |
| 2015/0220605 A1 | 8/2015 | Syed et al. |

(Continued)

OTHER PUBLICATIONS

Beschastnikh, L.; "Leveraging Existing Instrumentation to Automatically Infer Invariant-Constrained Models," ESEC/FSE'11, Sep. 5-9, 2011, Szeged, Hungary, 12 pages.

(Continued)

*Primary Examiner* — Charles Ehne
(74) *Attorney, Agent, or Firm* — Conley Rose. P.C.

(57) ABSTRACT

Aspects of the disclosure provide for a method. In at least some examples, the method includes receiving logs of a computer system, wherein a log comprises information regarding an operation of the computer system. The method also includes performing a course analysis of the logs to identify invariants, parameters, and gray area terms included in the logs, wherein gray area terms are terms included in the logs that are undefined between identifications of invariant or parameter by the course analysis. The method also includes performing a fine analysis to identify each of the gray area terms as either an invariant or a parameter to generate first log parsing templates, wherein the fine analysis is a sequence labeling analysis. The method also includes performing a similarity analysis to combine similar templates from among the first log parsing templates to form second log templates.

20 Claims, 4 Drawing Sheets

(56) References Cited

U.S. PATENT DOCUMENTS

2016/0124823 A1\* 5/2016 Ruan ............... G06F 11/0709
  714/26
2019/0066493 A1  2/2019 Sohn
2019/0354457 A1\* 11/2019 Urmanov ........... H04L 63/1425

OTHER PUBLICATIONS

Dhillon, et al., IPCOM000252021D; "Reinforcement Learning for Fuzzing Testing Techniques," Dec. 13, 2017, 36 pages.
Donny-Clark, et al., IPCOM000252095D; "Extracting Point of Interest Information From Query Logs," Dec. 15, 2017, 33 pages.
Lou, J-G. et al.; "Mining Invariants From Console Logs for System Problem Detection," USENIX, Jun. 2010, 14 Pages.
Zhu, J. et al.; "Tools and Benchmarks for Automated Log Parsing," arXiv1:1811.03509v2 [cs.SE] Jan. 3, 2019, 10 pages.

\* cited by examiner

LOG PARSING TEMPLATE GENERATION

BACKGROUND

The present disclosure relates generally to the field of data selection and, more particularly, to log data sampling.

Logs are textual messages generated by network devices, applications, operating systems, and programmable or smart devices. Logs contain information about system behaviors that lead to system faults and problems. Because logs are in an unstructured format, the logs are parsed, meaning converting unstructured textual log messages into a structured format, before a meaningful analysis can be performed. An example of log analysis is log anomaly detection. The log anomaly detection involves detecting anomalous system behaviors and finding signals that can provide clues to the reasons and the anatomy of a system's failure.

SUMMARY

Aspects of the disclosure provide for a method. In at least some examples, the method includes receiving a plurality of logs of a computer system, wherein a log comprises information regarding an operation of the computer system. The method also includes performing a course analysis of the received plurality of logs to identify a plurality of invariants, a plurality of parameters, and a plurality of gray area terms included in the received plurality of logs, wherein the identified plurality of gray area terms is a plurality of terms included in the received plurality of logs that are undefined between one invariant associated with the identified plurality of invariants or one parameter associated with the identified plurality of parameters by the course analysis. The method also includes performing a fine analysis to identify each of the identified plurality of gray area terms as either an invariant associated with the identified plurality of invariants or a parameter associated with the identified plurality of invariants to generate two or more first log parsing templates, wherein the fine analysis is a sequence labeling analysis. The method also includes performing a similarity analysis to combine two or more similar templates from among the two or more first log parsing templates to form two or more second log templates.

Other aspects of the disclosure provide for a system. In at least some examples, the system includes a memory having instructions and at least one processor in communication with the memory. The at least one processor is configured to receive a plurality of logs of a computer system, wherein a log comprises information regarding an operation of the computer system. The processor is also configured to perform a course analysis of the received plurality of logs to identify a plurality of invariants, a plurality of parameters, and a plurality of gray area terms included in the received plurality of logs. The identified plurality of gray area terms is a plurality of terms included in the received plurality of logs that are undefined between one invariant associated with the identified plurality of invariants or one parameter associated with the identified plurality of parameters by the course analysis. The processor is also configured to perform a fine analysis to identify each of the identified plurality of gray area terms as either an invariant associated with the identified plurality of invariants or a parameter associated with the identified plurality of invariants to generate two or more first log parsing templates. The fine analysis is a sequence labeling analysis. The processor is also configured to perform a similarity analysis to combine similar two or more templates from among the two or more first log parsing templates to form two or more second log templates, wherein the similarity analysis generates a similarity value. Two or more templates are deemed similar when the similarity value exceeds a threshold.

Other aspects of the disclosure provide for a computer program product comprising a computer readable storage medium having program instructions executable by a processor. Executing the instructions causes the processor to receive a plurality of logs of a computer system, wherein a log comprises information regarding an operation of the computer system. Executing the instructions also causes the processor to perform a course analysis of the received plurality of logs to identify a plurality of invariants, a plurality of parameters, and a plurality of gray area terms included in the logs, wherein gray area terms are terms included in the received plurality of logs that are undefined between identifications of invariant associated with the identified plurality of invariants or one parameter associated with the identified plurality of parameters by the course analysis. Executing the instructions also causes the processor to perform a fine analysis to identify each of the identified plurality of gray area terms as either an invariant associated with the identified plurality of invariants or a parameter associated with the identified plurality of invariants to generate two or more first log parsing templates, wherein the fine analysis is a sequence labeling analysis. Executing the instructions also causes the processor to perform a similarity analysis to combine two or more similar templates from among the two or more first log parsing templates to form two or more second log templates.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

Figure 1:
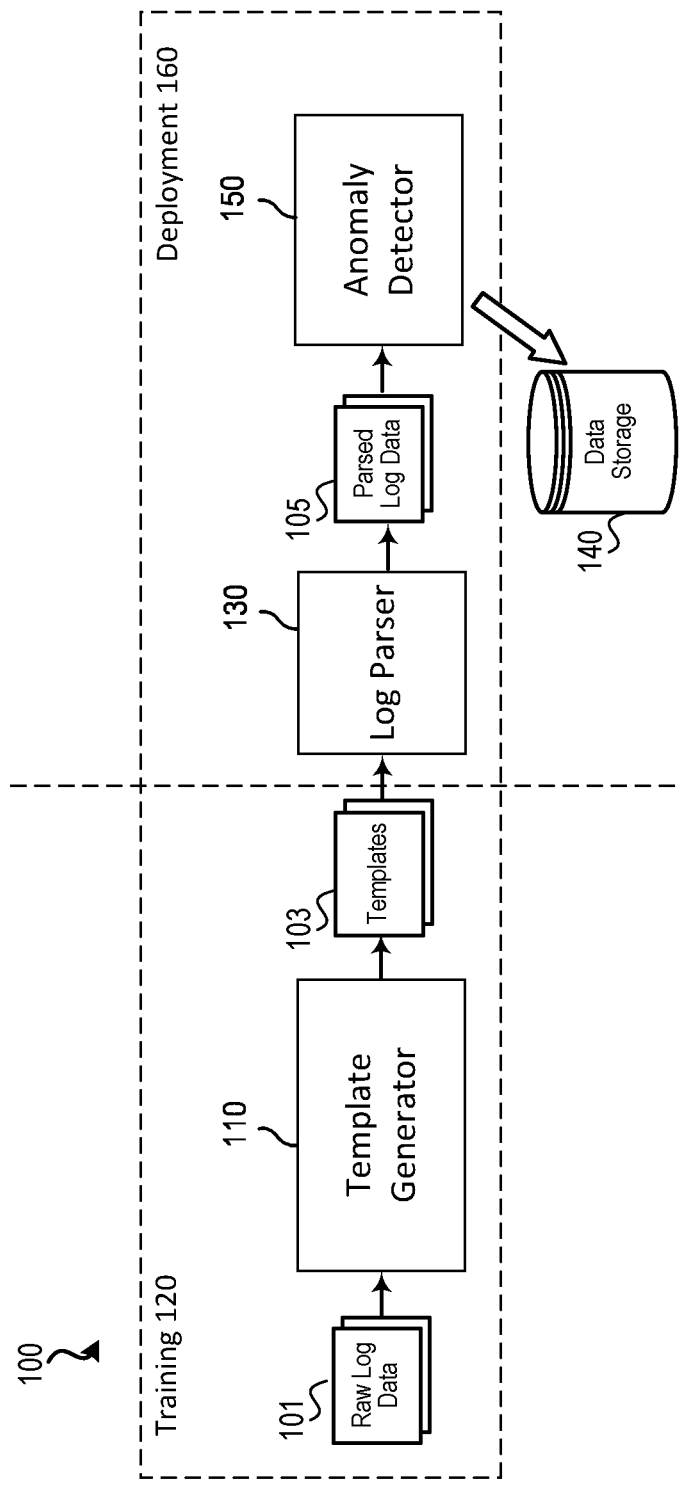
FIG. 1 is a block diagram of an anomaly detection environment in accordance with aspects of the present disclosure.

The illustrated figures are only exemplary and are not intended to assert or imply any limitation with regard to the environment, architecture, design, or process in which different embodiments may be implemented.

DETAILED DESCRIPTION

It should be understood at the outset that, although an illustrative implementation of one or more embodiments are provided below, the disclosed systems, computer program product, and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Microservice systems employs a software application that is developed as a suite of small services (i.e., microservices) and implemented on a cloud server. Each microservice independently runs its own process. Execution of such microservice system may involve a large number of microservice interactions. Most of these interactions are asynchronous and involve complex invocation chains. As a result, the number of logs produced from multiple microservices grows rapidly. For example, a size of the logs can amount to approximately 50 gigabytes per hour, which means the microservices can generate at least 120 to 200 million lines of logs per hour. Moreover, these massive logs are produced by distributed microservices separately and then uploaded to a centralized location for further analysis, which can result in missing, duplicated, or disordered logs. Furthermore, noise (e.g., erroneous data or errors) may be introduced into the original log data during collection, retrieval, and pre-processing of log data in such a cloud environment.

Conventionally, logs, or log entries, are parsed according to predefined and rigidly constructed templates to identify invariants and parameters of the logs. In at least some examples, an invariant is a token (e.g., such as a word) that remains constant across multiple instances of a template in the logs. Also in some examples, a parameter is a token that changes across multiple instances of a template in the logs. After parsing to identify the invariants and parameters, the log entries are grouped or clustered, such as by a distance-based clustering approach, such as a Levenshtein distance. Some conventional implementations of such clustering include Drain, simple logfile clustering tool (SLCT), logcluster, loghound, etc. However, any of these approaches rely on exact regular expression matching (e.g., a character by character identical match) in identifying the invariants and parameters and/or in performing the clustering. Such a rigid approach can result in inaccuracies in the log parsing and clustering, such as when log lines include long parameter chains (e.g., such as resulting from object dumps), misclassification of terms (e.g., such as when a term appears as both an invariant and a parameter), etc. This reduces the quality of log analysis outputs and degrades a user experience, or a system's automatic ability to, identify anomalies or trends based on the log analysis.

Accordingly, the present disclosure provides a technical solution for extraction of parameters from logs and clustering of the logs. Responsive to receipt of a log file, a system implementing the log analysis of this disclosure extracts terms from the log file to generate a frequency histogram. The frequency histogram determines a frequency at which terms appear in the log files. Terms appearing at a frequency (or percentage of all terms appearing) greater than a first threshold are determined to be invariants. Terms appearing at a frequency (or percentage of all terms appearing) less than a second threshold are determined to be parameters. Further processing is performed to determine whether terms appearing at a frequency between the first and second thresholds are invariants or parameters. For example, a word embedding technique may be used to process the terms appearing at frequencies between the first and second thresholds to determine whether those terms are invariants or parameters. After classifying a remainder of the identified terms as invariants or parameters, or discarding unclassifiable terms, the parameters are clustered to identify patterns. For example, in some implementations a fuzzy similarity based clustering is performed. The fuzzy similarity clustering, in some examples, uses weighted lexical similarity between corresponding word positions for fine-grained clustering of the parameters of the log. Based on a result of the fuzzy similarity clustering, templates are generated for parsing the log file.

Turning now to FIG. 1, a block diagram of an anomaly detection environment 100 in accordance with various examples of the disclosure is shown. The anomaly detection environment 100 includes two distinct environments—a training environment 120 and a deployment environment 160.

The training environment 120 is for training the anomaly detection environment 100 detect anomalies in logs based on parsing templates generated or refined by the training environment 120. The training environment 120 includes a template generator 110. The template generator 110 receives a collection of raw logs 101 as an input and outputs templates 103 resulting from analysis of the raw logs 101. In at least some examples, the template generator 110 corresponds to a machine learning model that is being trained on the raw log data to generate templates based on invariants and/or parameters identified in the raw logs 101 by the template generator 110. In some examples, the template generator 110 is trained under supervised, or partially supervised, learning.

The deployment environment 160 is for generating alerts that notify faults or errors in the computer system that generated logs, or for detecting otherwise anomalous events related to the raw log data 101. The deployment environment 160 includes a log parser 130 for producing parsed logs 105 based on templates 103 and raw log data 101 and an anomaly detector 150 that generates alerts based on information from the parsed logs 105. In some examples the deployment environment 160 further includes, or is in communication with, data storage 140, such as to store outputs of the anomaly detector 150.

Figure 2:
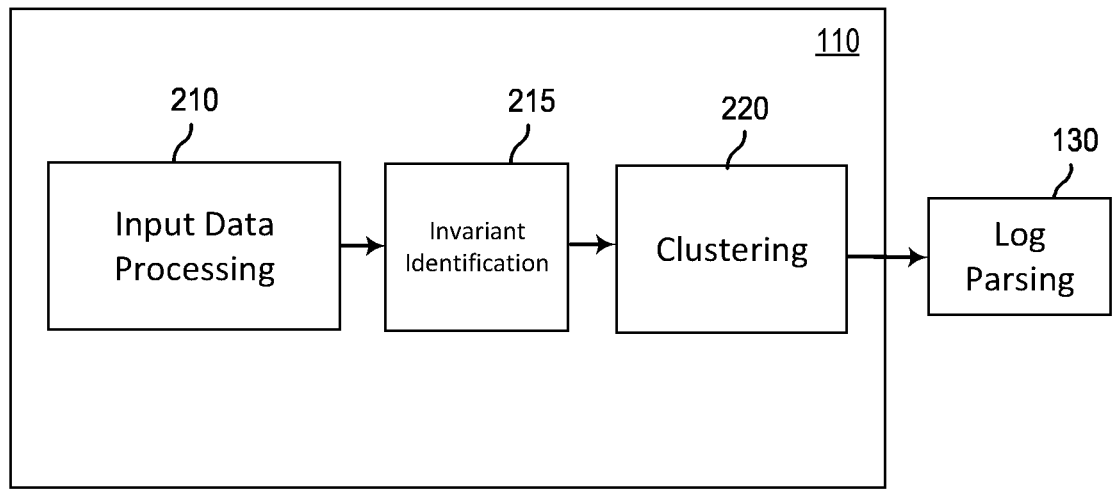
FIG. 2 is a block diagram of the template generator in accordance with aspects of the present disclosure.

FIG. 2 is a block diagram of the template generator 110 in accordance with aspects of the present disclosure. The template generator 110, in some examples, includes an input data processing module 210, an invariant identification module 215, and a clustering module 220.

The input data processing module 210 can receive raw logs (e.g., the raw log data 101 of FIG. 1) from a computer system such as a server, cloud server, or a component of the cloud server. In some examples, the input data processing module 210 performs preliminary processing on the raw logs, such as to validate, simplify, standardize, or otherwise process the logs. In other examples, the input data processing module 210 does not perform preliminary processing on the raw logs and instead provides the raw logs to the invariant identification module 215.

The invariant identification module 215 identifies invariants and/or parameters in the logs, either raw or processed, received from the input data processing module 210. In at least some examples, the invariant and/or parameter identification is a multi-stage process. In some implementations, the first stage of the invariant and/or parameter identification includes the invariant identification module 215 determining a histogram for terms appearing in the received logs. For example, the invariant identification module 215 may generate a word count based histogram for the terms appearing in the received logs. In such a histogram, a counter is incremented for each occurrence of a particular term in the received logs.

Based on the determined histogram, an approximate identification of invariants and parameters is made. For example, when a particular term appears a number of times in the received logs such that the particular term makes up greater than a first percentage of the received logs, that particular term may be determined with high confidence to be an invariant. In at least some examples, the first percentage is about 10 percent. Similarly, when another term appears a number of times in the received logs such that the another term makes up less than a second percentage of the received logs, that another term may be determined with high confidence to be a parameter. In at least some examples, the second percentage is about 0.1 percent. Terms appearing in the received logs that make up a percentage of the received lots between the first percentage and the second percentage may be undefined by the first stage of the invariant and/or parameter identification. For example, these terms may be either invariants or parameters and are referred to herein as gray area terms. In this way, the first stage of the invariant and/or parameter identification creates a soft boundary between invariants and parameters as compared to other approaches that create an absolute or hard boundary line where every term below a certain percentage is a parameter and every term above the certain percentage is an invariant. By creating the soft boundary rather than creating a hard boundary, additional flexibility and accuracy is added to the identification performed by the invariant identification module 215.

A second stage of the invariant and/or parameter identification includes the invariant identification module 215 implementing a sequence labeling approach to distinguish between invariants and parameters among the gray area terms. Based on the sequence labeling approach, the invariant identification module 215 identifies the invariants and parameters. The features used for the sequence labeling approach are embeddings for each word (e.g., character-based embeddings, pretrained embeddings, pre-trained contextual embeddings, etc.), positional information and context information. These features are fed to a bi-directional long short-term memory (LSTM) invariant identification module 215. The LSTM representations are then passed to a Conditional Random Field (CRM) model to decode the segment labels into the invariants and parameters. In some examples, a human user provides feedback or input to validate determinations of the invariant and parameter identification for the gray area terms for updating the CRM model. In some examples, a machine learning model is trained based on the sequence labeling approach and the human user feedback such that subsequent gray area terms are classified automatically by the invariant identification module 215 without human user validation or interaction.

The clustering module 220 receives templates output by the invariant identification module 215 and further processes those templates. For example, some log lines may include a variant followed by a first number of parameters, while other log lines may include that same variant followed by a second number of parameters. In the templates received by the clustering module 220, these may correspond to two templates. However, they may actually be considered the same template. Accordingly, the clustering module 220 may collapse or compress these multiple similar templates into single templates.

To begin, the clustering module 220 may sort or order the received templates lexicographically such that similar template patterns appear adjacently in a sorted order. The clustering module 220 then compares adjacent templates in the sorted order to determine a similarity of the compared templates. In at least some examples, the clustering module 220 utilizes a Jaccard similarity, or variant of a Jaccard similarity, for determining the similarity. In other examples, any suitable similarity determination process or algorithm is used for determining the similarity. The determined similarity is represented, in at least some examples, by a numerical similarity value. When the similarity value exceeds a programmed threshold, the clustering module clusters the two templates that are under analysis for similarity. The clustering collapses the two templates into a single template that is then compared to a next template in the sorted order such that the above process repeats until all adjacent templates in the sorted order have been analyzed for similarity.

In at least some examples, clustering or collapsing the similar templates into a single template includes the clustering module 220 abstracting a parameter field appearing in the similar templates. For example, the clustering module 220 may receive templates of "getFirstMatchingDialogNode( ):Evaluating DialogNode Id <*> <*> evaluated to TRUE," "getFirstMatchingDialogNode( ):Evaluating DialogNode Id <*> <*> <*> evaluated to FALSE," and "getFirstMatchingDialogNode( ):Evaluating DialogNode Id <*> <*> <*> <*> <*> evaluated to TRUE." Based on determined similarity values, these three templates may be clustered and collapsed to a single template of "getFirstMatchingDialogNode( ):Evaluating DialogNode Id <*> <*> <*> <*> <*> evaluated to TRUE." In another example, the clustering module 220 may receive templates of "Updated context: <*> <*> Nodes visited: <*> No actions," "Updated context: <*> <*> <*> <*> Nodes visited: <*> No actions," and "Updated context: <*> <*> <*> <*> Nodes visited: <*> No actions." Based on determined similarity values, these three templates may be clustered and collapsed to a single template of "Updated context: <*> Nodes visited: <*> No actions." In at least some examples, the templates output by the clustering module 220 are the templates 103 of FIG. 1.

The templates 103 now having been generated, returning to FIG. 1, the log parser 130 produces parsed logs 105 based on templates 103 and raw log data, which may be the same raw log data as was used to generate the templates 103, may be raw log data that is used to update the templates or create new, additional templates, or may be raw log data that is not used in template creation. In some examples, the log parser 130 may maintain the templates 103 as a dictionary of invariants and parameters. When the log parser 130 receives raw log data for parsing, the log parser 130 may generate a prefix tree based on the templates 103, as represented by the dictionary of invariants and parameters. In other examples, the log parser 130 may have previously generated and/or stored the prefix tree and may refer back to, or load, this previously generated prefix tree when raw log data is received for parsing. Based on the prefix tree, the log parser parses the raw log data to identify particular log patterns and/or values as the parsed log data 105. In some examples, the log parser 130 may produce the parsed logs 105 by applying fuzzy template matching to the raw log data based on the templates 103. When the fuzzy template matching reveals invariants and/or parameters not included among the templates 103, the templates 103 may be updated to include the newly revealed invariants and/or parameters, refining the templates 103.

The anomaly detector 150 receives the parsed log data 105 and analyzes the parsed log data 105 to determine whether an anomalous entry exists. The anomaly detector 150 may perform the analysis according to any suitable process. For example, in various implementations the anomaly detector 150 may compare the parsed log data 105 to a look-up table or database, may perform natural language or other cognitive processing on the parsed log data 105, may navigate a prefix tree of other data structure based on the parsed log data 105, or may perform any other suitable processing. Based on this processing, the anomaly detector 150 determines whether an anomalous entry exists in the raw log data, as represented by the parsed log data 105. When an anomaly is determined to exist, in at least some examples, the anomaly detector 150 generates an alert and transmits that alert to a user. In other examples, the anomaly detector 150 may transmit the alert to another device to modify a state of a device that generated the raw log data, as represented by the parsed log data 105. The device that receives the alert may be the device that generated the raw log data, as represented by the parsed log data 105, or a device that exerts control over that device that generated the raw log data, as represented by the parsed log data 105. Based on this alter, the device that generated the raw log data, as represented by the parsed log data 105, may be reprogrammed, reset, power-cycled, or otherwise have settings modified responsive to issuance of the alert by the anomaly detector 150. In other examples, information related to the alerts may be stored by the anomaly detector 150 in the data storage 140.

Figure 3:
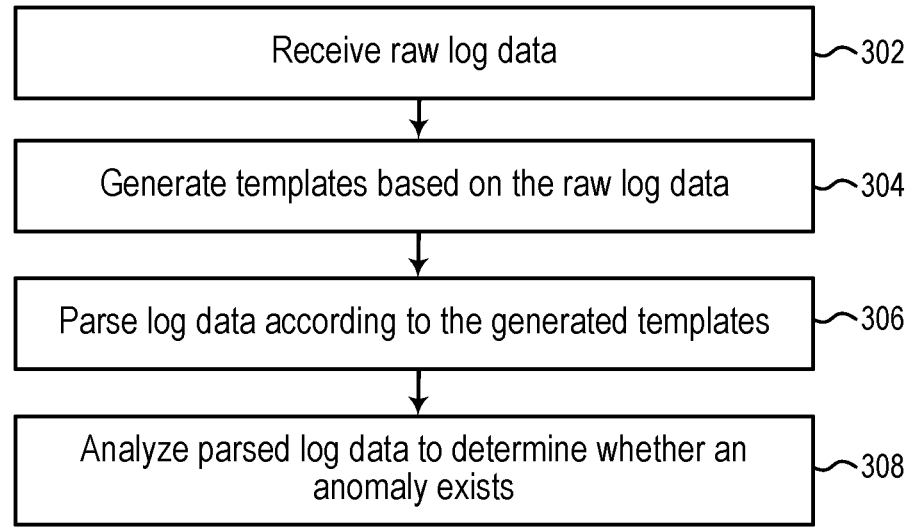
FIG. 3 is a flowchart of a method in accordance with aspects of the present disclosure.

FIG. 3 is a flowchart of a method 300 in accordance with aspects of the present disclosure. The method 300 is, in some examples, suitable for implementation in the anomaly detection environment 100, such as in various examples by the template generator 110, the log parser 130, and/or the anomaly detector 150, each of FIG. 1 and described elsewhere herein.

At operation 302, raw log data is received. The raw log data, in at least some examples, is output by a computing device such as a server, cloud computer, cloud server, etc. The raw log data includes multiple log lines that include invariants and parameters, as described elsewhere herein.

At operation 304, templates are generated based on the raw log data. In at least some examples, the templates are generated by the template generator 110, as described above. The templates may be generated by identifying invariants and parameters occurring in the log data, tokenizing the log lines of the raw log data based on the identified invariants and parameters, and clustering similar tokenized log lines to form the templates. For example, the invariant identification module 215, described above, identifies the invariants and parameters according to the histogram generation and sequence labeling approach described previously herein. Also as described above herein, the invariant identification module 215 tokenizes the log lines of the raw log data based on the identified invariants and parameters. Similarly, the clustering module 220, as described previously herein, clusters similar templates generated such as through the use of Jaccard similarity analysis.

At operation 306, log data is parsed according to the generated templates. For example, the log parser 130 described previously herein utilizes the templates generated at operation 304 to analyze received log data. For example, based on the generated templates a prefix tree may be generated and log lines of received log data analyzed according to the prefix tree to generate parsed log data.

At operation 308, the parsed log data is analyzed to determine whether an anomaly exists. For example, the anomaly detector 150, as described above, may analyze the parsed log data according to any suitable technique or process to identify anomalies in the log data from which the parsed log data was derived at operation 306. Based on this analysis and identification, an alert may be generated, a device may be reset, programming of a device may change, etc., each without human intervention.

Figure 4:
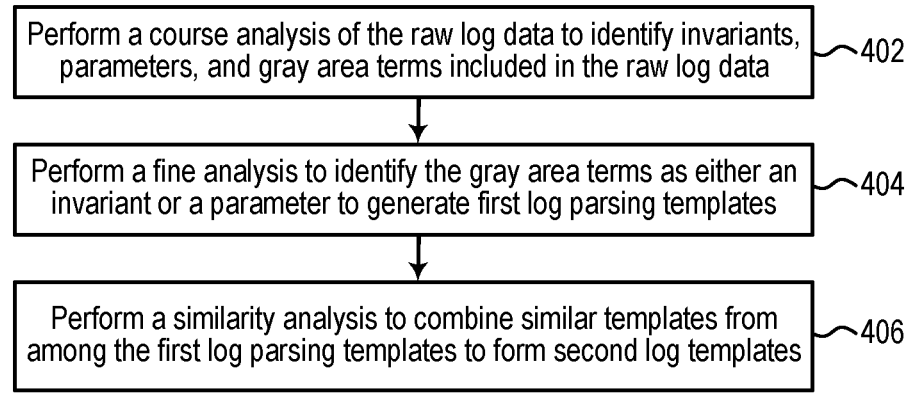
FIG. 4 is a flowchart of a method in accordance with aspects of the present disclosure.

FIG. 4 is a flowchart of a method 400 in accordance with aspects of the present disclosure. The method 400 is, in some examples, suitable for generating templates based on the raw log data as discussed above with respect to operation 304 of the method 300 of FIG. 3. Accordingly, in at least some examples, the method 400 may be implemented as, or by, the operation 304.

At operation 402, a course analysis of the raw log data is performed to identify invariants, parameters, and gray area terms included in the raw log data. The course analysis, in at least some examples, a histogram based analysis as described elsewhere herein. The gray area terms are, in some examples, terms included in the logs that are undefined between identifications of invariant or parameter by the course analysis.

At operation 404, a fine analysis is performed to identify each of the gray area terms as either an invariant or a parameter to generate first log parsing templates. In some examples, the fine analysis is a sequence labeling analysis, as described elsewhere herein.

At operation 406, a similarity analysis is performed to combine similar templates from among the first log parsing templates to form second log templates. The similarity analysis is, in some examples, a Jaccard, or Jaccard-based, similarity analysis. In some examples, the similarity analysis generates a similarity value and templates are deemed similar when the similarity value exceeds a threshold.

Although not shown in FIG. 4, in at least some examples after forming the fine analysis, the logs are tokenized, as described elsewhere herein, according to the identified invariants and parameters to generate the first log parsing templates.

Figure 5:
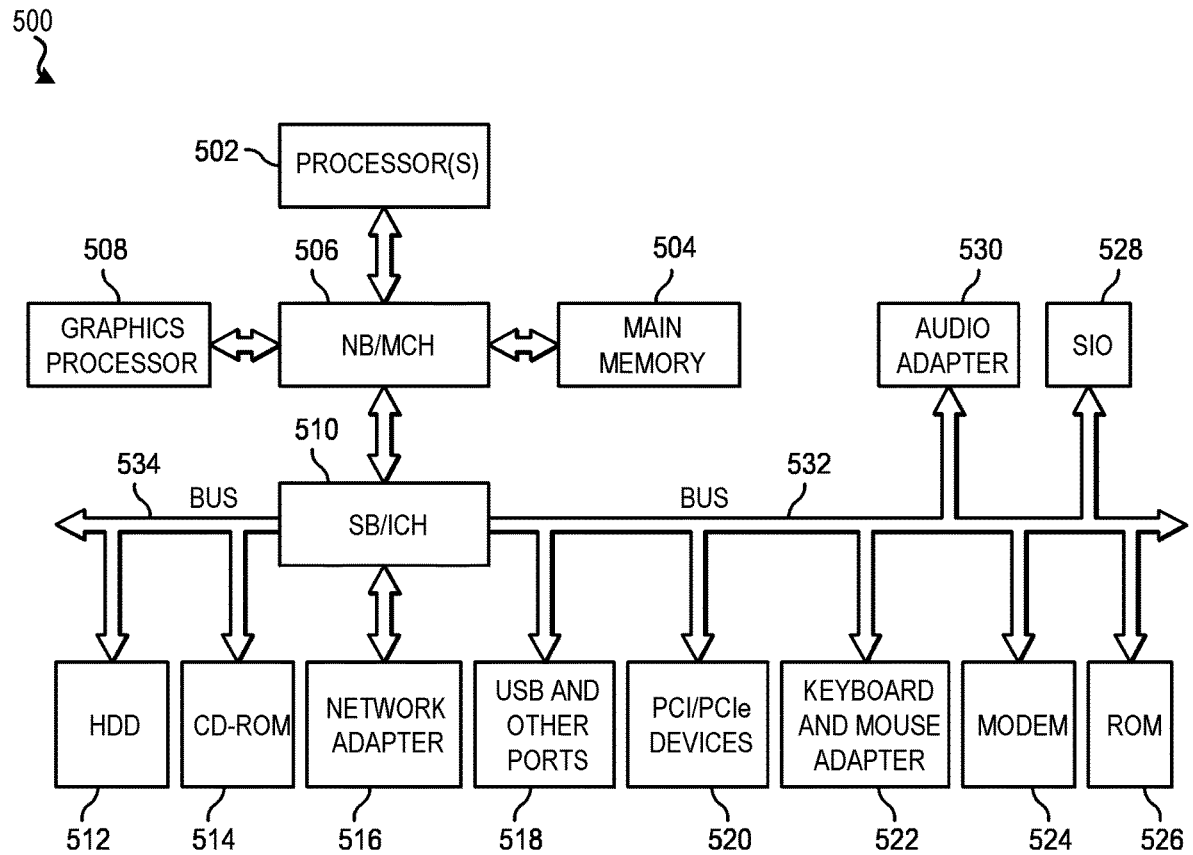
FIG. 5 is a block diagram of a hardware architecture of a data processing system in accordance with aspects of the present disclosure.

FIG. 5 is a block diagram of a hardware architecture of a data processing system 500 in accordance with aspects of the present disclosure. In some embodiments, one or more of the systems and/or components described herein (e.g., the template generator 110, the log parser 130, the anomaly detector 150, the data processing module 210, the invariant identification module 215, the clustering module 220, etc.) may be implemented using a corresponding one or more of the data processing system 500. Moreover, the data processing system 500 may be configured to store and execute one or more instructions of the method 300, the method 400, and/or any other methods and/or processes described herein.

The data processing system 500 employs a hub architecture including North Bridge and memory controller hub ("NB/MCH") 506 and south bridge and input/output ("I/O") controller hub ("SB/ICH") 510. Processor(s) 502, main memory 504, and graphics processor 508 are connected to NB/MCH 506. Graphics processor 508 may be connected to NB/MCH 506 through an accelerated graphics port ("AGP"). A computer bus, such as bus 532 or bus 534, may be implemented using any type of communication fabric or architecture that provides for a transfer of data between different components or devices attached to the fabric or architecture.

Network adapter 516 connects to SB/ICH 510. Audio adapter 530, keyboard and mouse adapter 522, modem 524, read-only memory ("ROM") 526, hard disk drive ("HDD") 512, compact disk read-only memory ("CD-ROM") drive 514, universal serial bus ("USB") ports and other communication ports 518, and peripheral component interconnect/peripheral component interconnect express ("PCI/PCIe") devices 520 connect to SB/ICH 510 through bus 532 and bus 534. PCI/PCIe devices may include, for example, Ethernet adapters, add-in cards, and personal computing ("PC") cards for notebook computers. PCI uses a card bus controller, while PCIe does not. ROM 526 may comprise, for example, a flash basic input/output system ("BIOS"). Modem 524 or network adapter 516 may be used to transmit and receive data over a network.

HDD 512 and CD-ROM drive 514 connect to SB/ICH 510 through bus 534. HDD 512 and CD-ROM drive 514 may use, for example, an integrated drive electronics ("IDE") or serial advanced technology attachment ("SATA") interface. In some embodiments, the HDD 512 may be replaced by other forms of data storage devices including, but not limited to, solid-state drives ("SSDs"). A super I/O ("SIO") device 528 may be connected to SB/ICH 510. SIO device 528 may comprise a chip on the motherboard that is configured to assist in performing less demanding controller functions for the SB/ICH 510 such as controlling a printer port, controlling a fan, and/or controlling the small light emitting diodes ("LEDS") of the data processing system 500.

The data processing system 500 may include a single processor 502 or may include a plurality of processors 502. Additionally, processor(s) 502 may have multiple cores. In some embodiments, data processing system 500 may employ a large number of processors 502 that include hundreds or thousands of processor cores. In some embodiments, the processors 502 may be configured to perform a set of coordinated computations in parallel.

An operating system is executed on the data processing system 500 using the processor(s) 502. The operating system coordinates and provides control of various components within the data processing system 500. Various applications and services may run in conjunction with the operating system. Instructions for the operating system, applications, and other data are located on storage devices, such as one or more of the HDD 512, and may be loaded into main memory 504 for execution by processor(s) 502. In some embodiments, additional instructions or data may be stored on one or more external devices. The processes described herein for the illustrative embodiments may be performed by processor(s) 502 using computer usable program code, which may be located in a memory such as, for example, main memory 504, ROM 526, or in one or more peripheral devices.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random-access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including a scripting language, such as Python or the like, an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In accordance with aspects of the present disclosure, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented method, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. Further, the steps of the methods described herein may be carried out in any suitable order, or simultaneously where appropriate. The terminology used herein was chosen to best explain the principles of the embodiments, the practical application or technical improvement over technologies found in the marketplace, or to enable others of ordinary skill in the art to understand the embodiments disclosed herein.

As used within the written disclosure and in the claims, the terms "including" and "comprising" (and inflections thereof) are used in an open-ended fashion, and thus should be interpreted to mean "including, but not limited to." Unless otherwise indicated, as used throughout this document, "or" does not require mutual exclusivity, and the singular forms "a," "an," and "the" are intended to include the plural forms as well, unless the context clearly indicates otherwise.

A "module" or "unit" (and inflections thereof) as referenced herein comprises one or more hardware or electrical components such as electrical circuitry, processors, and memory that may be specially configured to perform a particular function. The memory may comprise volatile memory or non-volatile memory that stores data such as, but not limited to, computer executable instructions, machine code, and other various forms of data. The module or unit may be configured to use the data to execute one or more instructions to perform one or more tasks. In certain instances, a module or unit may also refer to a particular set of functions, software instructions, or circuitry that is configured to perform a specific task. For example, a module or unit may comprise software components such as, but not limited to, data access objects, service components, user interface components, application programming interface ("API") components; hardware components such as electrical circuitry, processors, and memory; and/or a combination thereof. As referenced herein, computer executable instructions may be in any form including, but not limited to, machine code, assembly code, and high-level programming code written in any programming language.

What is claimed is:

1. A method comprising:
    receiving a plurality of logs of a computer system, wherein a log comprises information regarding an operation of the computer system;
    performing a course analysis of the received plurality of logs to identify a plurality of invariants, a plurality of parameters, and a plurality of gray area terms included in the received plurality of logs, wherein the identified plurality of gray area terms is a plurality of terms included in the received plurality of logs that are undefined between one invariant associated with the identified plurality of invariants or one parameter associated with the identified plurality of parameters by the course analysis;
    performing a fine analysis to identify each of the identified plurality of gray area terms as either an invariant associated with the identified plurality of invariants or a parameter associated with the identified plurality of invariants to generate two or more first log parsing templates, wherein the fine analysis is a sequence labeling analysis; and
    performing a similarity analysis to combine two or more similar templates from among the two or more first log parsing templates to form two or more second log templates.

2. The method of claim 1, wherein the similarity analysis generates a similarity value, and wherein two or more templates are deemed similar when the similarity value exceeds a threshold.

3. The method of claim 2, wherein the similarity analysis is a Jaccard similarity analysis.

4. The method of claim 1, wherein the course analysis includes generating a word count based on a histogram that counts each word appearing in the plurality of logs.

5. The method of claim 4, wherein the plurality of terms identified by the histogram as appearing in the plurality of logs as a percentage of all words of the plurality of logs less than a first threshold are identified as the plurality of parameters, wherein the plurality of terms identified by the histogram as appearing in the plurality of logs as a percentage of all words of the plurality of logs greater than a second threshold are identified as the plurality of invariants, and wherein terms identified by the histogram as appearing in the plurality of logs as a percentage of all words of the plurality of logs less than a first threshold and greater than the second threshold are identified as the plurality of gray area terms.

6. The method of claim 1, further comprising, after performing the fine analysis to identify each of the gray area terms associated with the plurality of gray area terms as either an invariant associated with the plurality of invariants or a parameter associated with the plurality of parameters, tokenizing the plurality of logs according to the identified plurality of invariants and identified plurality of parameters to generate the two or more first log parsing templates.

7. The method of claim 1, further comprising:
parsing a new log data according to the two or more second log templates to generate a parsed log data;
analyzing the parsed log data to determine whether an anomalous event is represented in the new log data as represented by the parsed log data; and
generating and transmitting an alert when the anomalous event is determined to be represented in the new log data as represented by the parsed log data.

8. A system comprising:
a memory having instructions; and
at least one processor in communication with the memory, wherein the at least one processor is configured to:
receive a plurality of logs of a computer system, wherein a log comprises information regarding an operation of the computer system;
perform a course analysis of the received plurality of logs to identify a plurality of invariants, a plurality of parameters, and a plurality of gray area terms included in the received plurality of logs, wherein the identified plurality of gray area terms is a plurality of terms included in the received plurality of logs that are undefined between one invariant associated with the identified plurality of invariants or one parameter associated with the identified plurality of parameters by the course analysis;
perform a fine analysis to identify each of the identified plurality of gray area terms as either an invariant associated with the identified plurality of invariants or a parameter associated with the identified plurality of invariants to generate two or more first log parsing templates, wherein the fine analysis is a sequence labeling analysis; and
perform a similarity analysis to combine two or more similar templates from among the two or more first log parsing templates to form two or more second log templates, wherein the similarity analysis generates a similarity value, and wherein two or more templates are deemed similar when the similarity value exceeds a threshold.

9. The system of claim 8, wherein the similarity analysis is a Jaccard similarity analysis.

10. The system of claim 8, wherein the course analysis includes generating a word count based on a histogram that counts each word appearing in the plurality of logs.

11. The system of claim 10, wherein the plurality of terms identified by the histogram as appearing in the plurality of logs as a percentage of all words of the plurality of logs less than a first threshold are identified as the plurality of parameters, wherein the plurality of terms identified by the histogram as appearing in the plurality of logs as a percentage of all words of the plurality of logs greater than a second threshold are identified as the plurality of invariants, and wherein terms identified by the histogram as appearing in the plurality of logs as a percentage of all words of the plurality of logs less than a first threshold and greater than the second threshold are identified as the plurality of gray area terms.

12. The system of claim 8, wherein the processor is further configured to, after performing the fine analysis to identify each of the gray area terms associated with the plurality of gray area terms as either an invariant associated with the plurality of invariants or a parameter associated with the plurality of parameters, tokenize the plurality of logs according to the identified plurality of invariants and plurality of logs according to the identified plurality of invariants and identified plurality of parameters to generate the two or more first log parsing templates.

13. The system of claim 8, wherein the processor is further configured to:
parse a new log data according to the two or more second log templates to generate parsed log data;
analyze the parsed log data to determine whether an anomalous event is represented in the new log data as represented by the parsed log data; and
generate and transmit an alert when the anomalous event is determined to be represented in the new log data as represented by the parsed log data.

14. A computer program product comprising a computer readable storage medium having program instructions executable by a processor to cause the processor to:
receive a plurality of logs of a computer system, wherein a log comprises information regarding an operation of the computer system;
perform a course analysis of the received plurality of logs to identify a plurality of invariants, a plurality of parameters, and a plurality of gray area terms included in the logs, wherein gray area terms are terms included in the received plurality of logs that are undefined between one invariant associated with the identified plurality of invariants or one parameter associated with the identified plurality of parameters by the course analysis;
perform a fine analysis to identify each of the identified plurality of gray area terms as either an invariant associated with the identified plurality of invariants or a parameter associated with the identified plurality of invariants to generate two or more first log parsing templates, wherein the fine analysis is a sequence labeling analysis; and
perform a similarity analysis to combine two or more similar templates from among the two or more first log parsing templates to form two or more second log templates.

15. The computer program product of claim 14, wherein the similarity analysis generates a similarity value, and wherein two or more templates are deemed similar when the similarity value exceeds a threshold.

16. The computer program product of claim 15, wherein the similarity analysis is a Jaccard similarity analysis.

17. The computer program product of claim 14, wherein the course analysis includes generating a word count based on a histogram that counts each word appearing in the plurality of logs.

18. The computer program product of claim 17, wherein the plurality of terms identified by the histogram as appearing in the plurality of logs as a percentage of all words of the plurality of logs less than a first threshold are identified as the plurality of parameters, wherein the plurality of terms identified by the histogram as appearing in the plurality of logs as a percentage of all words of the plurality of logs greater than a second threshold are identified as the plurality of invariants, and wherein terms identified by the histogram as appearing in the plurality of logs as a percentage of all words of the plurality of logs less than a first threshold and greater than the second threshold are identified as the plurality of gray area terms.

19. The computer program product of claim 14, wherein the instructions executable further cause the processor to, after performing the fine analysis to identify each of the gray area terms associated with the plurality of gray area terms as either an invariant associated with the plurality of invariants or a parameter associated with the plurality of parameters, tokenize the plurality of logs according to the identified plurality of invariants and identified plurality of parameters to generate the two or more first log parsing templates.

20. The computer program product of claim 14, wherein the instructions executable further cause the processor to:
   parse a new log data according to the two or more second log templates to generate parsed log data;
   analyze the parsed log data to determine whether an anomalous event is represented in the new log data as represented by the parsed log data; and
   generate and transmit an alert when the anomalous event is determined to be represented in the new log data as represented by the parsed log data.

* * * * *